(12) United States Patent
Sakota et al.

(10) Patent No.: US 12,227,369 B2
(45) Date of Patent: Feb. 18, 2025

(54) PART TRANSPORTING DEVICE

(71) Applicant: Seki Kogyo Co., Ltd., Hatsukaichi (JP)

(72) Inventors: Kouji Sakota, Hatsukaichi (JP); Seiji Miura, Hatsukaichi (JP)

(73) Assignee: Seki Kogyo Co., Ltd., Hirosima (JP)

( * ) Notice: Subject to any disclaimer, the term of this patent is extended or adjusted under 35 U.S.C. 154(b) by 575 days.

(21) Appl. No.: 17/693,484

(22) Filed: Mar. 14, 2022

(65) Prior Publication Data

US 2022/0204282 A1 Jun. 30, 2022

Related U.S. Application Data

(63) Continuation of application No. PCT/JP2020/006845, filed on Feb. 20, 2020.

(30) Foreign Application Priority Data

Sep. 27, 2019 (JP) .................................. 2019-177766

(51) Int. Cl.
*B65G 47/14* (2006.01)
*B65G 47/256* (2006.01)
*B65G 54/02* (2006.01)

(52) U.S. Cl.
CPC ....... *B65G 47/1485* (2013.01); *B65G 47/256* (2013.01); *B65G 54/02* (2013.01)

(58) Field of Classification Search
CPC ...... B65G 47/14–1414; B65G 47/1428; B65G 47/1485; B65G 47/24; B65G 47/256; B65G 54/02
See application file for complete search history.

(56) References Cited

U.S. PATENT DOCUMENTS

| | | | | | |
|---|---|---|---|---|---|
| 3,952,857 | A | * | 4/1976 | Nazuka ................. | B65G 29/02 198/619 |
| 4,318,943 | A | * | 3/1982 | Veenstra ................ | B65G 29/02 198/457.06 |
| 4,818,378 | A | * | 4/1989 | Elliott .................... | B65G 54/02 209/225 |
| 5,862,905 | A | * | 1/1999 | Shimonishi ............ | B65G 54/02 198/690.1 |
| 5,913,402 | A | * | 6/1999 | Miura ................ | B65G 47/1485 198/690.1 |

(Continued)

FOREIGN PATENT DOCUMENTS

| | | |
|---|---|---|
| CN | 1611427 A | 5/2005 |
| JP | H09077256 A | 3/1997 |
| JP | H11-059878 A | 3/1999 |

*Primary Examiner* — Gene O Crawford
*Assistant Examiner* — Keith R Campbell
(74) *Attorney, Agent, or Firm* — Renner, Otto, Boisselle & Sklar, LLP

(57) ABSTRACT

A nut transporting device includes: an outer cylinder, multiple attracting members that are arrayed in a spiral shape about a center axis extending in an axial direction of the outer cylinder, on an inner surface side of the outer cylinder and that form a magnetic field on an outer surface side of the outer cylinder to attract a weld nut to an outer surface of the outer cylinder; a rotary drive unit configured to rotatably move the attracting members about the center axis; and a restriction guide that restricts rotational movement of the weld nut to move the weld nut axially along the outer surface of the outer cylinder.

9 Claims, 7 Drawing Sheets

(56) References Cited

U.S. PATENT DOCUMENTS

| 6,123,184 | A | * | 9/2000 | Yasuda | B65G 47/1485 |
| | | | | | 198/690.1 |
| 6,945,384 | B2 | * | 9/2005 | Sakota | B65G 47/1485 |
| | | | | | 198/690.1 |
| 2005/0092584 | A1 | | 5/2005 | Sakota et al. | |

* cited by examiner

PART TRANSPORTING DEVICE

CROSS-REFERENCE TO RELATED APPLICATIONS

This is a continuation of International Application No. PCT/JP2020/6845 filed on Feb. 20, 2020, which claims priority to Japanese Patent Application No. 2019-177766 filed on Sep. 27, 2019. The entire disclosures of these applications are incorporated by reference herein.

BACKGROUND

The present disclosure relates to a part transporting device.

A part transporting device configured to transport parts has been known.

For example, a part alignment device (a part transporting device) disclosed in Japanese Unexamined Patent Publication No. H11-59878 includes a face plate, attracting members each of which rotatably move on the back surface side of the face plate along a particular circumferential line corresponding to a particular rotational trajectory about a center axis perpendicular to the face plate to form a magnetic field on the front surface side of the face plate, and a rotary drive unit configured to rotate the attracting members about the center axis. The part alignment device (the part transporting device) further includes, sequentially in the rotation direction of the attracting members along the particular rotational trajectory of the attracting members across the face plate, on the front surface side of the face plate, a tubular orientation changing guide for changing an orientation of a part attracted by the attracting members so that either the front or back surface of the part faces the face plate with rotational movement of the attracting members, and a front/back sorting member for allowing passage of the part having a front surface facing the face plate and rejecting the part having a back surface facing the face plate against attracting force of the magnetic field to block passage of the part based on a difference in the thickness of a protrusion from the face plate in a case where the part is attracted with its front or back surface facing the face plate.

SUMMARY

In the part alignment device (the part transporting device) according to Japanese Unexamined Patent Publication No. H11-59878 described above, the part is lifted by rotation of the attracting member about the horizontal axis (the center axis). In other words, the part is forced to laterally move following the arc trajectory from the part storage on the lower side to the front/back sorting member on the upper side, which makes the size of the device larger inevitably.

The present disclosure has been made in view of the problem. It is a main objective of the present disclosure to downsize the part transporting device.

A part transporting device of the present disclosure includes: an outer cylinder, multiple attracting members that are arrayed in a spiral shape about a center axis extending in an axial direction of the outer cylinder, on an inner surface side of the outer cylinder and that form a magnetic field on an outer surface side of the outer cylinder to attract a part to an outer surface of the outer cylinder, a rotary drive unit configured to rotatably move the attracting members about the center axis; and a restriction member that restricts rotational movement of the part to move the part axially along the outer surface of the outer cylinder.

According to such a configuration, the part is attracted to the outer surface of the outer cylinder by some of the attracting members arrayed in a spiral shape. The part tends to rotatably move circumferentially along the outer surface of the outer cylinder with rotation of the attracting members about the center axis. However, the rotational movement of the part is restricted by the restriction member. In other words, the attracting members rotatably move, but the part does not rotatably move. The attracting members are arrayed in a spiral shape. With the rotational movement of the attracting members, the attracting members appear one after another on one side of the part in the axial direction. Accordingly, the part is sequentially attracted to the attracting members appearing one after another, and moves to one side in the axial direction along the outer surface of the outer cylinder. In other words, the part only moves along the outer surface of the outer cylinder, and does not move further out of the outer cylinder. Thus, the size of the device does not need to be increased.

In one aspect, the part transporting device further includes a front/back sorting member. The front/back sorting member allows passage of the part having a front surface facing the outer surface, and rejects the part having a back surface facing the outer surface to block passage of the part, based on a difference in a thickness of a protrusion from the outer surface of the outer cylinder.

According to such a configuration, the front/back of the part can be sorted, and the orientation of the part can be changed to be unified.

In one aspect, the outer cylinder extends vertically.

According to such a configuration, the part moves in an up-down direction along the outer surface of the outer cylinder. Thus, the horizontal size of the device can be reduced.

In one aspect, the part transporting device further includes a part storage that is provided on the outer surface side of the outer cylinder and below the front/back sorting member and that stores multiple parts therein in a non-aligned state.

According to such a configuration, the part rejected by the front/back sorting member drops in the part storage positioned vertically below. The rejected part is again attracted by the attracting members and is supplied to the front/back sorting member. This is efficient.

In one aspect, the part transporting device further includes an orientation changing member provided on the outer surface side of the outer cylinder. The orientation changing member changes an orientation of the part such that the front or back surface of the part faces the outer surface of the outer cylinder.

According to such a configuration, the orientation changing member can change an orientation of a standing part (in an orientation where the side surface of the part faces the outer surface of the outer cylinder) to be laid (an orientation where the front or back surface of the part faces the outer surface of the outer cylinder). Specifically, the orientation changing member can change the part to be laid so that the part can be sorted by the front/back sorting member. Thus, sorting of the part by the front/back sorting member can be more reliably performed.

In one aspect, the rotary drive unit includes a holder that holds the attracting members with the attracting members arrayed in the spiral shape, and a drive section configured to rotate the holder about the center axis.

According to such a configuration, mere rotation of the holder by the drive section can cause rotational movement of the attracting members. Thus, the configuration is simple.

In one aspect, the outer cylinder is in a cylindrical shape.

According to such a configuration, movement of the part along the outer surface of the outer cylinder is smoother than that in a case where the outer cylinder is in a prism shape, for example.

In one aspect, each of the attracting members is a pair of permanent magnets adjacent to each other and having different magnetic poles facing the outer cylinder.

According to such a configuration, a strong magnetic field is locally formed at a midpoint between the permanent magnets in pair. Accordingly, the part is constantly attracted to the midpoint; therefore, the position of the part attracted to the outer surface of the outer cylinder is stabilized.

In one aspect, each of the attracting members is a pair of permanent magnets adjacent to each other and having identical magnetic poles facing the outer cylinder.

According to such a configuration, a uniform magnetic field is formed across a wide area. This allows even a large part to be attracted to the outer surface of the outer cylinder.

According to the present disclosure, the part transporting device can be downsized.

DETAILED DESCRIPTION

Hereinafter, an embodiment of the present disclosure will be described in detail with reference to the drawings. The following description of an advantageous embodiment is a mere example in nature, and is not at all intended to limit the scope, applications or use of the present disclosure.

Figure 7:
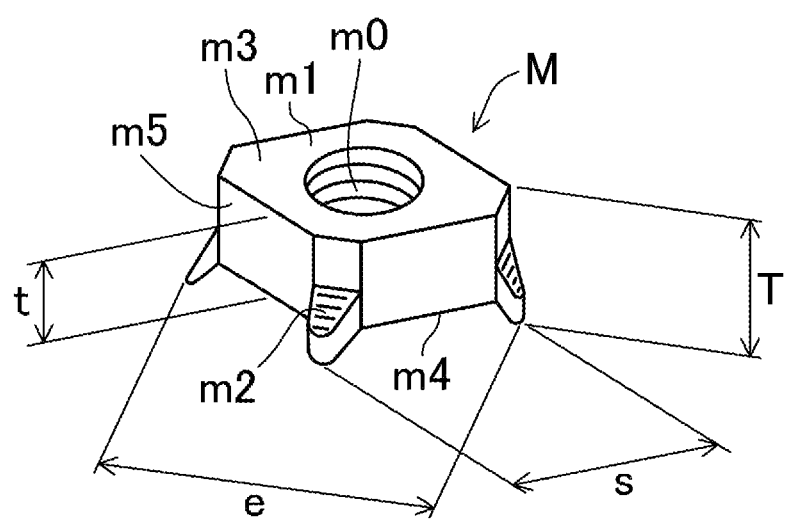
FIG. 7 is a perspective view of the weld nut.

For a nut transporting device 1 as a part transporting device according to the present embodiment, a square weld nut M is a part to be transported. The weld nut M will be described with reference to FIG. 7. The weld nut M is formed by integrating a nut body m1 and protrusions m2. The nut body m1 has a predetermined thickness t, and a front surface m3 and a back surface m4 thereof parallel with each other and each formed in a substantially square shape in plan view. The protrusions m2 each protrude from four corners of the nut body m1 toward the back surface m4. In other words, the total thickness T of the weld nut M is obtained by adding a protruding dimension of each protrusion m2 to the thickness t of the nut body m1. A screw hole is penetrating the center m0 of the weld nut M. m5 indicates a side surface of the weld nut M, s indicates the width across flat dimension of the weld nut M, and e indicates the diagonal dimension of the weld nut M.

First, the general configuration of the nut transporting device 1 will be described with reference to FIG. 1. The nut transporting device 1 includes a feeding chute 2, a device body 3, a conveyer 4, a base 5, and a controller 6. Many weld nuts M are separately fed into the feeding chute 2. The device body 3 (the part transporting device) extends vertically, and upwardly transports the weld nuts M fed into the feeding chute 2. The conveyer 4 conveys separately the weld nuts M, which have been transported from the device body 3, to a nut welding machine (not shown) by using air pressure, for example. A lower end of the device body 3 is fixed to the base 5.

The feeding chute 2 includes a rectangular box-shaped body 2a and a deep dish-shaped receiver 2b provided below the body 2a. The inside of the body 2a is divided into a hopper portion 2d and a housing portion 2e housing part of the device body 3, by a partition plate 2c. An opening 2f is provided in an upper surface of the hopper portion 2d. Part of the device body 3 vertically penetrates the housing portion 2e. The receiver 2b covers both a lower portion of the hopper portion 2d and a lower portion of the housing portion 2e. Here, the partition plate 2c and the receiver 2b are not coupled to each other, and a clearance 2h is provided between a lower end 2g of the partition plate 2c and a bottom surface of the receiver 2b. In other words, the hopper portion 2d and the housing portion 2e communicate with each other through the clearance 2h. In the present embodiment, the feeding chute 2 is formed of a transparent acrylic plate. The material of the feeding chute 2 is not particularly limited, and may be metal, for example.

The device body 3 includes an outer cylinder 20. The outer cylinder 20 has a cylindrical shape extending vertically. The outer cylinder 20 is housed in the housing portion 2e of the feeding chute 2. Moreover, the outer cylinder 20 vertically penetrates the bottom surface of the receiver 2b. Accordingly, a nut storage 30 as a part storage surrounded by the outer cylinder 20 and the receiver 2b is formed on an outer surface side of the outer cylinder 20. The weld nuts M are stored in a non-aligned state in the nut storage 30. In other words, the weld nuts M fed into the hopper portion 2d through the opening 2f of the feeding chute 2 move in the receiver 2b from a hopper portion 2d to a housing portion 2e through the clearance 2h. Then, the weld nuts M are stored in the nut storage 30.

Figure 3:
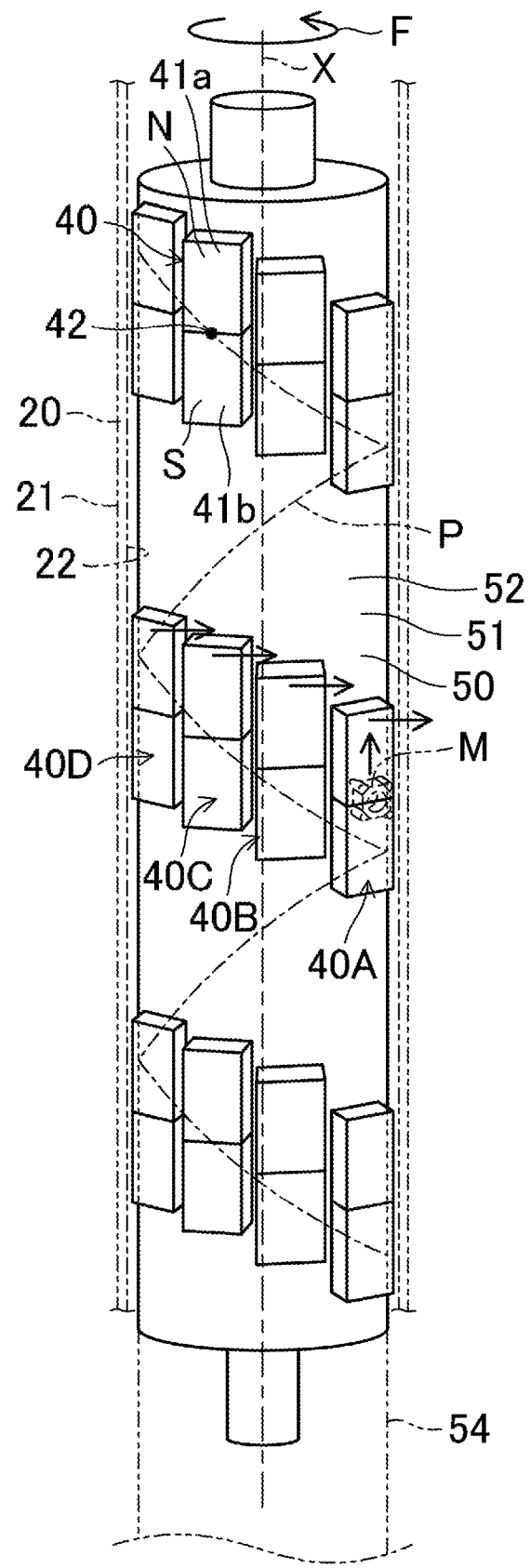
FIG. 3 is a perspective view showing a holder and attracting members.

FIG. 3 shows an inner surface 22 side (the inside) of the outer cylinder 20. Hereinafter, the configurations of attracting members 40 and rotary drive unit 50 will be described in detail with reference to FIG. 3. Multiple attracting members 40 are provided on the inner surface 22 side of the outer cylinder 20 (schematically shown by chain double-dashed lines in FIG. 3). The attracting members 40 are arrayed in a spiral shape about a center axis X extending in an axial direction of the outer cylinder 20 (hereinafter, the spiral formed by the array of the attracting members 40 will be referred to as a "spiral P"). In the present embodiment, the center axis X of the spiral P is concentric with the center axis of the outer cylinder 20. In other words, the center axis of the outer cylinder 20 is also X (see FIG. 1). The attracting members 40 each form a magnetic field on an outer surface 21 side of the outer cylinder 20 to attract the weld nut M to the outer surface 21 of the outer cylinder 20. The direction of the spiral P is left-handed (S-winding).

The device body 3 includes the rotary drive unit 50. The rotary drive unit 50 rotatably moves the attracting members 40 about the center axis X. Specifically, the rotary drive unit 50 has a shaft 51 as a holder. The shaft 51 is housed on the inner surface 22 side of the outer cylinder 20. The shaft 51 has a columnar shape extending vertically about the center axis X. A clearance is provided between an outer surface 52 of the shaft 51 and the inner surface 22 of the outer cylinder 20. The shaft 51 holds the attracting members 40 with the attracting members 40 arrayed in the spiral shape. Specifically, the attracting members 40 are fixed to the shaft 51 by welding or with an adhesive, for example.

The attracting members 40 are each a pair of permanent magnets 41a, 41b adjacent to each other and having different magnetic poles facing the outer cylinder 20 (facing radially outward). Specifically, the pair of permanent magnets 41a, 41b forms a rectangular parallelepiped shape, and are arranged axially. The permanent magnet 41a is arranged on the upper side in the axial direction, and the N-pole thereof faces the outer cylinder 20. The permanent magnet 41b is arranged on the lower side in the axial direction, and the S-pole thereof faces the outer cylinder 20. The reference numeral "42" indicates a midpoint between the permanent magnets in pair. A locally strong magnetic field is formed at the midpoint 42. Therefore, the weld nut M is likely to be attracted to a position corresponding to the midpoint 42 on the outer surface 21 of the outer cylinder 20.

The rotary drive unit 50 has a motor 54 as a drive section. The center axis of the motor 54 is coupled to the lower end of the shaft 51, and rotates the shaft 51 about the center axis X. The rotational direction of the motor 54 is clockwise (a direction F in FIG. 3) as viewed from the lower side in the axial direction (hereinafter merely referred to as "clockwise"). As shown in FIG. 1, a lower end of the motor 54 is fixed to the base 5. The motor 54 is provided with a speed controller 11. The speed controller 11 adjusts the rotation speed of the motor 54.

Figure 1:
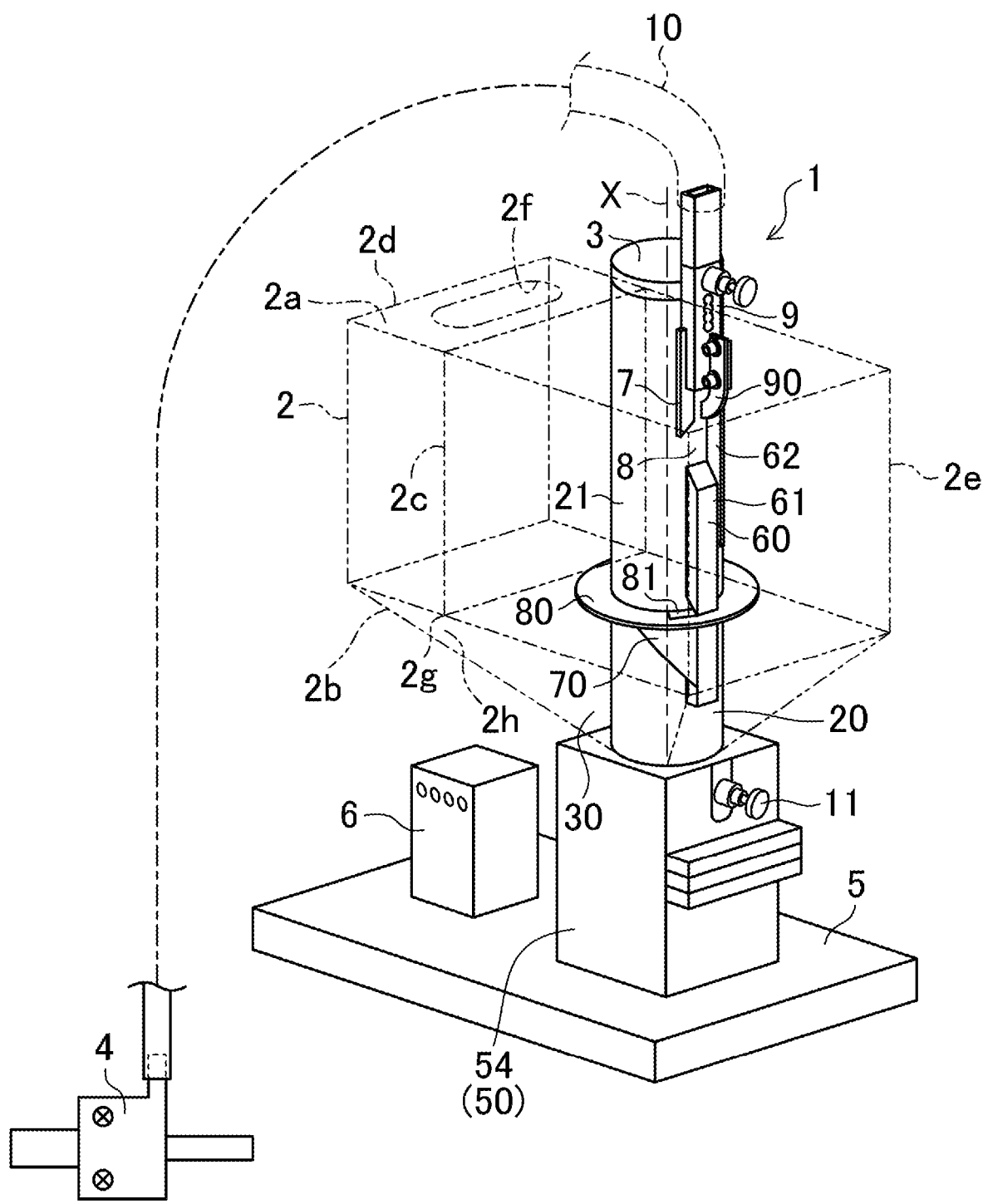
FIG. 1 is a perspective view of a nut transporting device of an embodiment of the present disclosure.

As shown in FIG. 1, the controller 6 is adjacent to the motor 54 and fixed to the base 5. The controller 6 controls the rotation speed of the motor 54.

Figure 2:
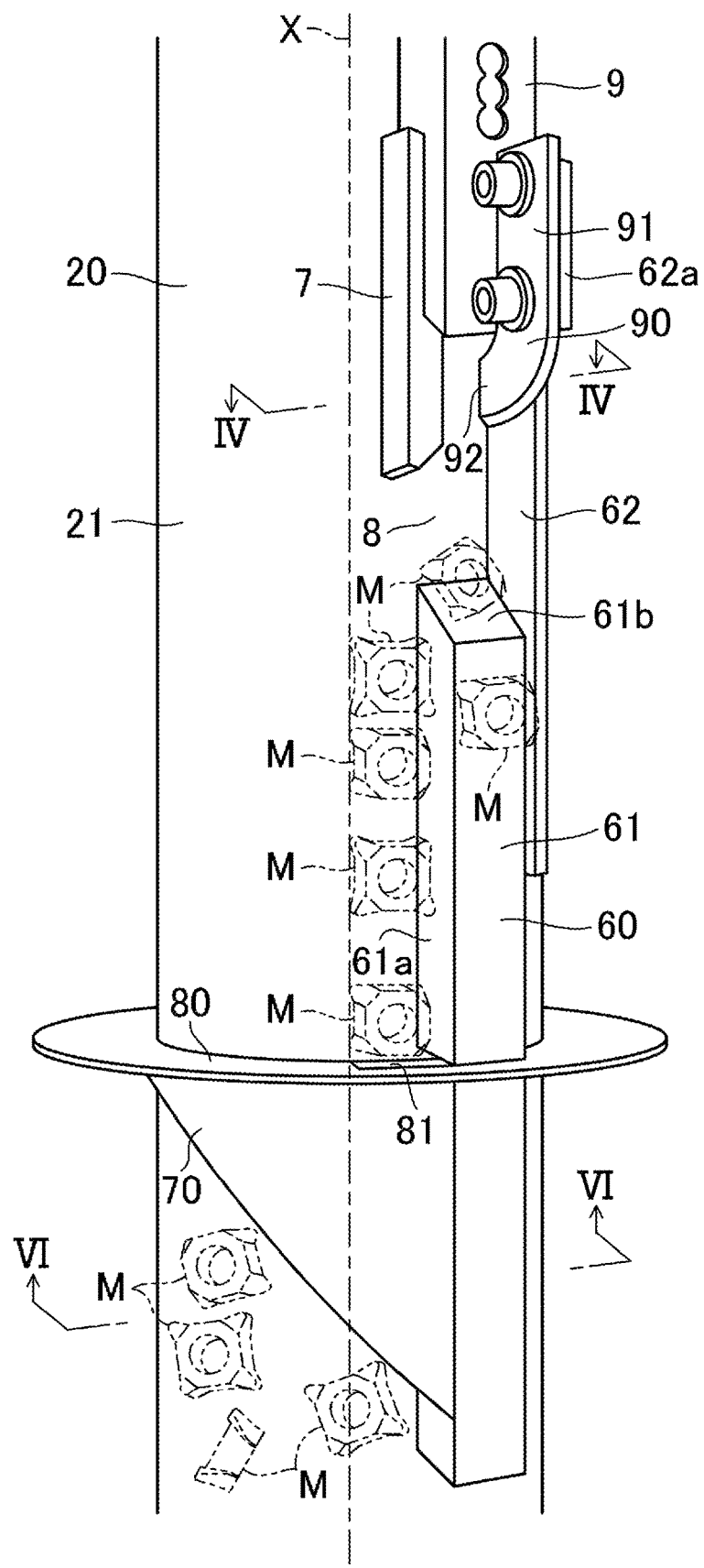
FIG. 2 is an enlarged perspective view of the vicinity of an outer cylinder in FIG. 1.

As shown in FIG. 2, the device body 3 includes a restriction guide 60 as a restriction member. The restriction guide 60 has a first guide portion 61 and a second guide portion 62. The first guide portion 61 is provided at a portion extending axially from a middle portion to a lower end on the outer surface 21 of the outer cylinder 20. The first guide portion 61 protrudes radially outward of the outer surface 21, and extends axially. Similarly to the first guide portion 61, the second guide portion 62 protrudes radially outward of the outer surface 21, and extends axially. The second guide portion 62 is positioned above the first guide portion 61. In addition, the second guide portion 62 is arranged so as to be slightly shifted clockwise from the first guide portion 61 in a circumferential direction. Specifically, a lower end of the second guide portion 62 overlaps with an upper end of the first guide portion 61. The lower end of the second guide portion 62 is coupled to the side surface at the upper end of the first guide portion 61 on the circumferential clockwise side (the right side in FIG. 2).

The function of the restriction guide 60 will be described. Although details will be described later, the restriction guide 60 restricts rotational movement of the weld nut M. First, the weld nut M is attracted to the outer surface 21 of the outer cylinder 20 by an attracting member 40A as one of the attracting members 40 arrayed in the spiral shape (see FIG. 3). The weld nut M tends to rotatably move circumferentially clockwise along the outer surface 21 of the outer cylinder 20 with clockwise rotation of the attracting member 40A about the center axis X. However, the rotational movement of the weld nut M is restricted by the restriction guide 60. In other words, the attracting member 40A rotatably moves, but the weld nut M does not rotatably move. As shown in FIG. 3, the attracting members 40 are arrayed in the spiral shape. With the rotational movement of the attracting members 40, attracting members 40B, 40C, 40D, . . . upstream (on the circumferential counterclockwise side) of the attracting member 40A in the rotational direction thus appear one after another above the weld nut M in the axial direction. Accordingly, the weld nut M is sequentially attracted to the attracting members 40B, 40C, 40D, . . . appearing one after another, and moves axially upward along the outer surface 21 of the outer cylinder 20.

Figure 6:
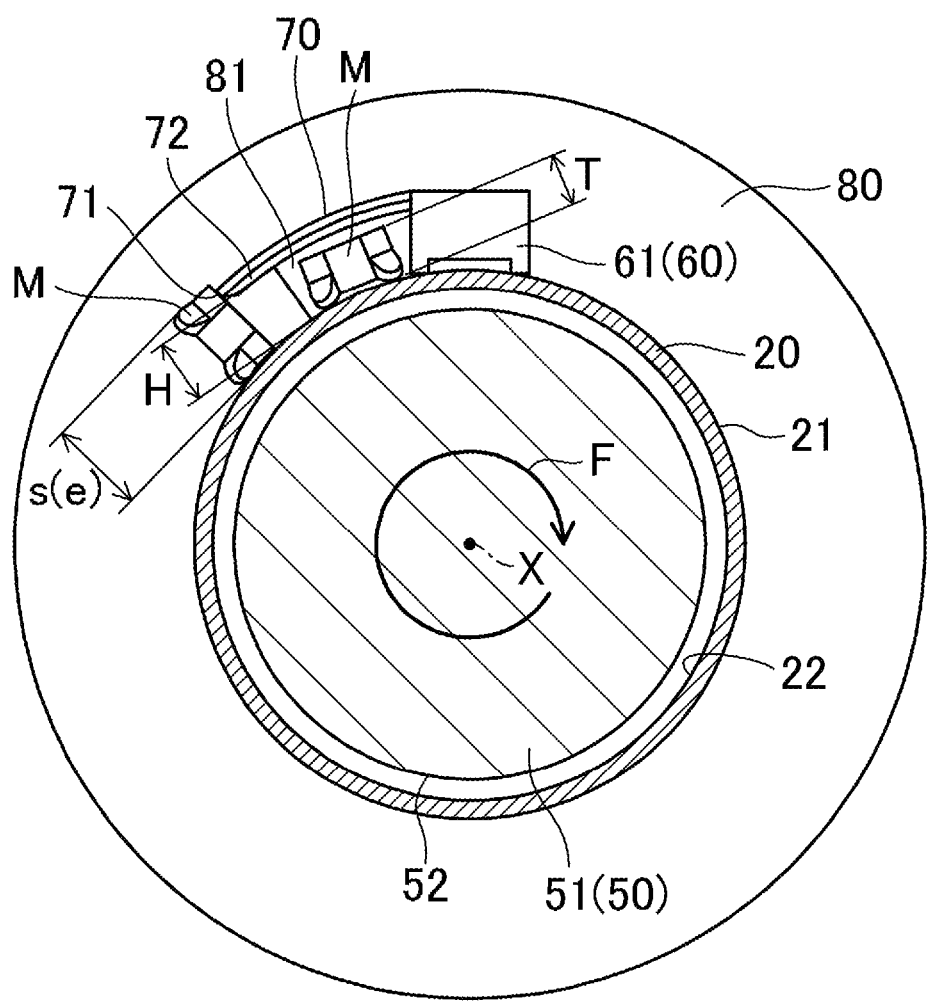
FIG. 6 is a sectional view taken along line VI-VI of FIG. 2.

As shown in FIG. 2, the device body 3 includes an orientation changing guide 70 as an orientation changing member. The orientation changing guide 70 is provided at a lower portion on the outer surface 21 of the outer cylinder 20. The orientation changing guide 70 is formed of a substantially triangular plate-shaped member. As shown in FIG. 6, the orientation changing guide 70 is bent to correspond to the curved shape of the outer surface 21 of the outer cylinder 20. As shown in FIG. 6, the orientation changing guide 70 covers part of the outer surface 21 of the outer cylinder 20 with a predetermined clearance H. The orientation changing guide 70 is fixed to the lower portion of the side surface of the first guide portion 61 of the restriction guide 60 on the circumferential counterclockwise side (the left side in FIGS. 2 and 6). As shown in FIG. 6, the clearance H between the orientation changing guide 70 and the outer surface 21 of the outer cylinder 20 is greater than the total thickness T of the weld nut M and smaller than the width across flat dimension s of the weld nut M. In other words, the orientation changing guide 70 allows passage of the laid weld nut M (in an orientation where the front surface m3 or the back surface m4 of the weld nut M faces the outer surface 21 of the outer cylinder 20), whereas disallow passage of the standing weld nut M (an orientation where the side surface m5 of the weld nut M faces the outer surface 21 of the outer cylinder 20). As shown in FIG. 6, the orientation changing guide 70 is provided with a chamfered portion 71 at an end surface on the circumferential counterclockwise side (the left side in FIGS. 2 and 6). Moreover, the orientation changing guide 70 is provided with a chamfered portion 72 at an end surface on the axially lower side (the lower side in FIG. 2, the near side in the plane of paper of FIG. 6). With this configuration, the standing weld nut M which is about to pass through the orientation changing guide 70 from the circumferential counterclockwise side is guided to the chamfered portion 71 of the orientation changing guide 70 and is laid. Similarly, the standing weld nut M which is about to pass through the orientation changing guide 70 from the axially lower side is guided to the chamfered portion 72 of the orientation changing guide 70 and is laid. In other words, the orientation changing guide 70 changes the orientation of the standing weld nut M to be laid. The laid weld nut M can pass through the orientation changing guide 70.

The device body 3 includes a stopper 80. As shown in FIGS. 2 and 6, the stopper 80 has a disk shape provided across the entire circumference of the outer surface 21 of the outer cylinder 20. As shown in FIG. 2, a notch is formed at the first guide portion 61 of the restriction guide 60, and the stopper 80 engages with the notch. The stopper 80 is positioned on the axially upper side of the orientation changing guide 70. Specifically, the stopper 80 is coupled to an upper end of the orientation changing guide 70. The stopper 80 restricts axially upward movement of the weld nut M.

A through-hole 81 axially penetrating the stopper 80 is provided in the vicinity of an engagement portion of the stopper 80 with the first guide portion 61 of the restriction guide 60. Specifically, the through-hole 81 is provided in the stopper 80 to face the guide surface 61a of the first guide portion 61. The through-hole 81 forms an alignment guide (hereinafter referred to as an "alignment guide 81"). The width dimension of the alignment guide 81 is slightly greater than the diagonal dimension e of the weld nut M. In other words, the alignment guide 81 prevents passage of multiple laid weld nuts M passed through the orientation changing guide 70, and aligns the weld nuts M in line.

The stopper 80 restricts, at a lower portion of the outer surface 21 of the outer cylinder 20, axially upward movement of the weld nut M, and causes the weld nut M to move circumferentially clockwise. In other words, axially upward movement of the weld nut M is restricted by contact with the stopper 80, and such a weld nut M is guided circumferentially clockwise. In other words, the weld nut M positioned on the circumferentially counterclockwise side with respect to the orientation changing guide 70 is guided to the orientation changing guide 70 by the stopper 80. Accordingly, the weld nut M passes through the orientation changing guide 70 from the circumferential counterclockwise side. Then, the weld nut M further moves circumferentially clockwise along the stopper 80, and contacts the first guide portion 61 of the restriction guide 60. Then, the weld nut M is guided by the first guide portion 61, and moves axially upward toward the alignment guide 81. The same also applies to the weld nut M which has passed through the orientation changing guide 70 from the axially lower side.

Figure 4:
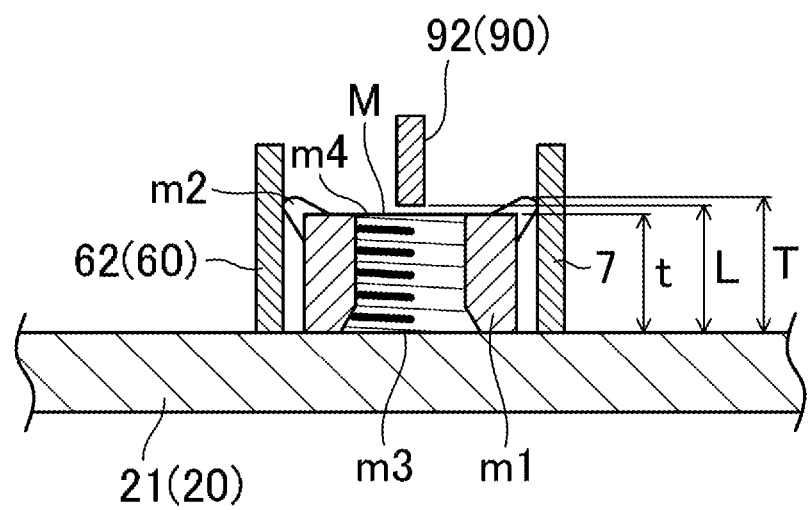
FIG. 4 is a sectional view taken along line IV-IV of FIG. 2 in a state in which a front surface of a weld nut faces an outer surface of an outer cylinder.
Figure 5:
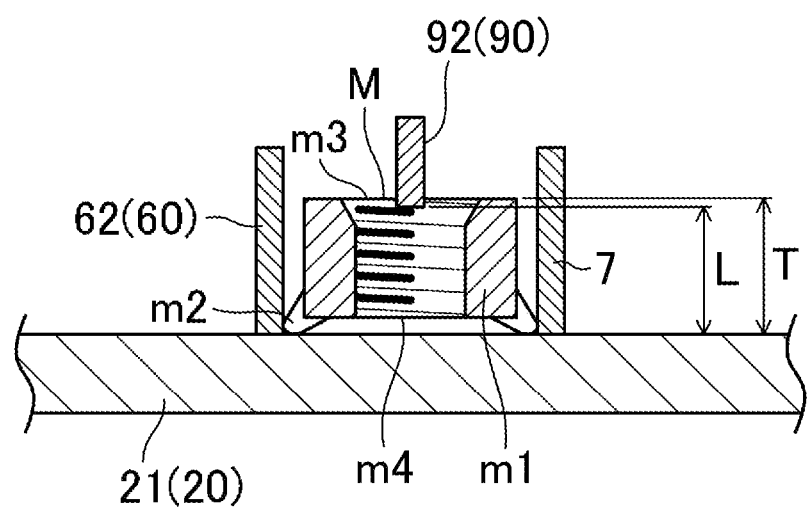
FIG. 5 is a view corresponding to FIG. 4 in a state in which a back surface of the weld nut faces the outer surface of the outer cylinder.

As shown in FIG. 2, the device body 3 includes a front/back sorting guide 90 as a front/back sorting member. The front/back sorting guide 90 is in an L-shape, and an attachment portion 91 and a projection 92 are perpendicular to each other. As shown in FIG. 2, the attachment portion 91 extends in the axial direction of the outer cylinder 20. The projection 92 extends vertically toward the outer surface 21 of the outer cylinder 20. The second guide portion 62 of the restriction guide 60 is provided with a fixing portion 62a protruding radially outward, and the attachment portion 91 is fixed to the fixing portion 62a. As shown in FIGS. 4 and 5, a clearance L between the projection 92 and the outer surface 21 of the outer cylinder 20 is smaller than the total thickness T of the weld nut M and slightly greater than the thickness t of a nut body m1.

The front/back sorting guide 90 sorts the front/back of the weld nut M based on a difference in the thickness of protrusion of the weld nut M, which is guided by the second guide portion 62 and moves axially upward, from the outer surface 21 of the outer cylinder 20. Specifically, when the weld nut M is in an orientation where the front surface m3 faces the outer surface 21 of the outer cylinder 20 as shown in FIG. 4, the weld nut M passes through the front/back sorting guide 90 without contacting the front/back sorting guide 90. Specifically, as shown in FIG. 4, the substantially center position of the weld nut M between both protrusions m2, m2 radially adjacent to each other passes through the front/back sorting guide 90. On the other hand, when the weld nut M is in an orientation where the back surface m4 faces the outer surface 21 of the outer cylinder 20 as shown in FIG. 5, such a weld nut M is rejected by the front/back sorting guide 90, and passage of the weld nut M through the front/back sorting guide 90 is blocked. The weld nut M rejected by the front/back sorting guide 90 drops onto the nut storage 30 positioned vertically below.

As shown in FIG. 2, a projection prevention guide 7 is provided in the vicinity of the front/back sorting guide 90 on the outer surface 21 of the outer cylinder 20. The projection prevention guide 7 axially extends and faces the second guide portion 62. The projection prevention guide 7 restricts projection of the weld nut M, which has passed or is about to pass through the front/back sorting guide 90 while being guided by the second guide portion 62, toward the circumferential counterclockwise side. An interval between the projection prevention guide 7 and the second guide portion 62 is slightly greater than the width (width across flat) dimension s of the weld nut M. As shown in FIG. 2, a clearance 8 is provided between a lower end of the projection prevention guide 7 and the upper end of the first guide portion 61 in the axial direction. At the upper end of the first guide portion 61, an inclined surface 61b inclined downward toward the outside in the radial direction is provided. With this configuration, the weld nut M rejected by the front/back sorting guide 90 smoothly drops along the inclined surface 61b without being caught by the upper end of the first guide portion 61.

As shown in FIG. 2, a channel member 9 is provided between the projection prevention guide 7 and the second guide portion 62 above the front/back sorting guide 90. The channel member 9 has a groove shape in cross section, and covers the outer surface 21 of the outer cylinder 20. The weld nut M which has passed through the front/back sorting guide 90 further moves axially upward through the inside of the channel member 9, and thereafter is supplied to the conveyer 4 through a tube 10 (see FIG. 1).

As described above, according to the present embodiment, the weld nut M is attracted to the outer surface 21 of the outer cylinder 20 by the attracting member 40A as one of the attracting members 40 arrayed in the spiral shape. The weld nut M tends to rotatably move circumferentially along the outer surface 21 of the outer cylinder 20 with rotation of the attracting member 40A about the center axis. However, the rotational movement of the weld nut M is restricted by the restriction guide 60. In other words, the attracting member 40A rotatably moves, but the weld nut M does not rotatably move. As shown in FIG. 3, the attracting members 40 are arrayed in the spiral shape. With the rotational movement of the attracting members 40, attracting members 40B, 40C, 40D, . . . upstream (on the circumferential counterclockwise side) of the attracting member 40A in the rotational direction thus appear one after another above the weld nut M in the axial direction. Accordingly, the weld nut M is sequentially attracted to the attracting members 40B, 40C, 40D, . . . appearing one after another, and moves axially along the outer surface 21 of the outer cylinder 20. In other words, the weld nut M only moves along the outer surface 21 of the outer cylinder 20, and does not move further toward the outside of the outer cylinder 20. Thus, the size of the device does not need to be increased.

With the front/back sorting guide 90, the front/back of the weld nut M can be sorted, and the orientation of the weld nut M can be changed to be unified.

The outer cylinder 20 vertically extends. The weld nut M thus moves in the up-down direction along the outer surface 21 of the outer cylinder 20. Accordingly, the device can be downsized in the horizontal direction.

The weld nut M rejected by the front/back sorting guide 90 drops onto the nut storage 30 positioned vertically below.

Such a weld nut M is attracted by the attracting member 40 and is supplied to the front/back sorting guide 90 again. This is efficient.

The orientation changing guide 70 can change the standing weld nut M (in an orientation where the side surface m5 of the weld nut M faces the outer surface 21 of the outer cylinder 20) to be laid (in an orientation where the front surface m3 or the back surface m4 of the weld nut M faces the outer surface 21 of the outer cylinder 20). In other words, the weld nut M can be laid so that the weld nut M can be sorted by the front/back sorting guide 90. Thus, sorting of the weld nut M by the front/back sorting guide 90 can be more reliably performed.

The attracting members 40 can be rotatably moved only by rotation of the shaft 51 using the motor 54. The structure is thus simple.

The outer cylinder 20 is in the cylindrical shape. The movement of the weld nut M along the outer surface 21 of the outer cylinder 20 is thus smoother than that in a case where the outer cylinder 20 is in a rectangular tubular shape, for example.

A strong magnetic field is locally formed at the midpoint 42 between the permanent magnets 41 in pair. Accordingly, the part is constantly attracted to the midpoint; therefore, the position of the weld nut M attracted to the outer surface 21 of the outer cylinder 20 is stabilized.

Although the present disclosure has been described above with reference to the preferred embodiment, the description is not a limitation. Needless to say, various variations can be made.

Figure 8:
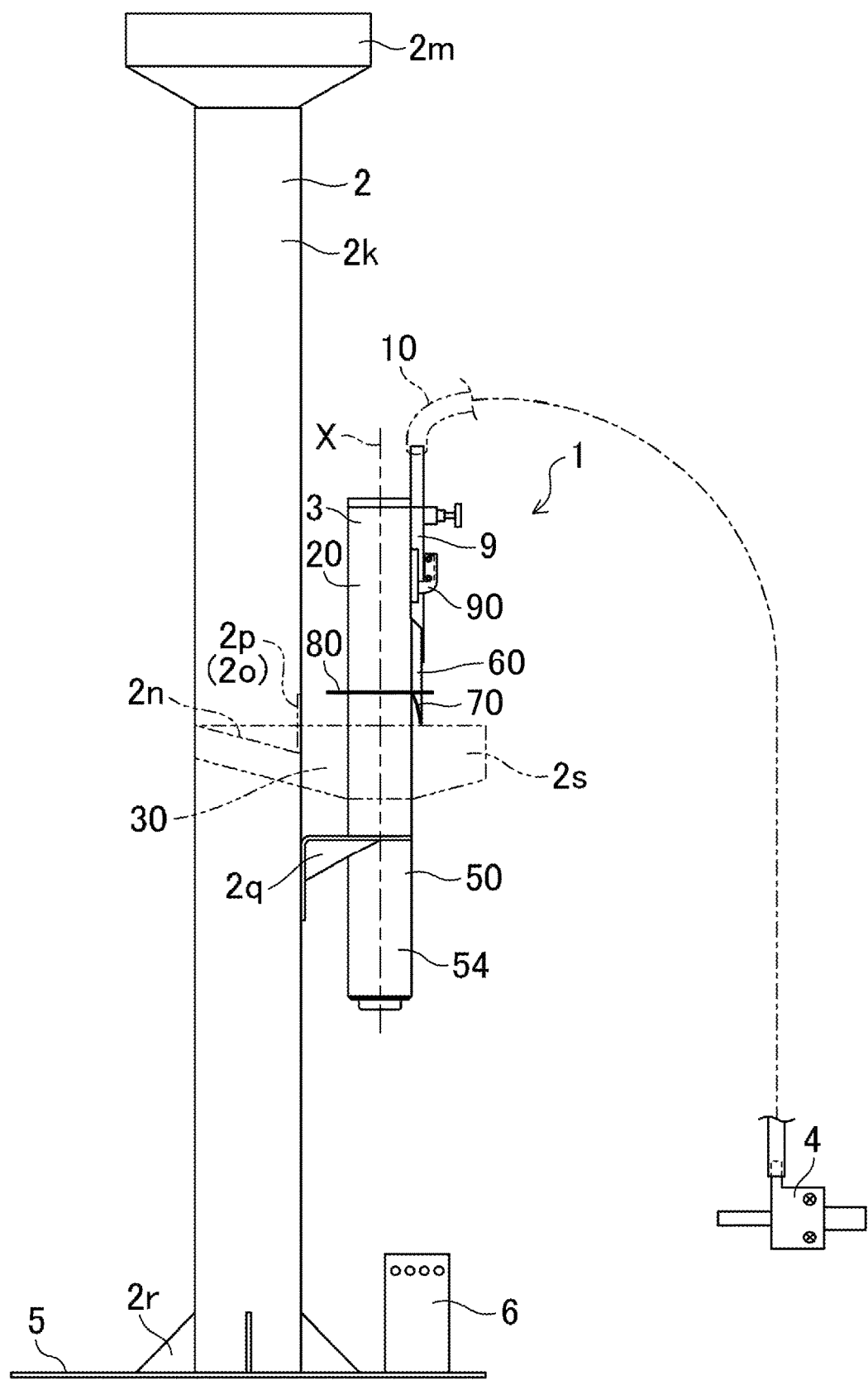
FIG. 8 is a perspective view of a nut transporting device of a variation of the embodiment of the present disclosure.

For example, FIG. 8 shows a nut transporting device 1 according to a variation of the present embodiment. A pipe 2k is provided at the feeding chute 2 of the part transporting device 1. In the present embodiment, the pipe 2k is a square pipe. The pipe 2k may be, e.g., a round pipe and the cross-sectional shape thereof is not particularly limited. A hopper 2m is provided at an upper end opening of the pipe 2k. The pipe 2k penetrates a bottom surface of a deep dish-shaped nut receiver 2s. The nut receiver 2s is formed of an acrylic plate, for example. The material of the nut receiver 2s is not particularly limited and may be metal, for example. The outer cylinder 20 of the device body 3 also penetrates the bottom surface of the nut receiver 2s. The nut storage 30 surrounded by the outer cylinder 20 and the nut receiver 2s is formed on the outer surface 21 side of the outer cylinder 20. An inclined plate 2n inclined downward toward the outer cylinder 20 is provided above the nut receiver 2s in the pipe 2k. A communication hole 2o is provided in the side surface of the pipe 2k above the inclined plate 2n and near the outer cylinder 20. The communication hole 2o is covered with an adjustment plate 2p. The adjustment plate 2p can be opened and closed by control with the controller 6. With this configuration, the weld nut M fed from the hopper 2m drops downward in the pipe 2k. Then, the weld nut M is guided by the inclined plate 2n, and moves toward the outer cylinder 20. When the adjustment plate 2p is open, the weld nut M drops onto the nut storage 30 through the communication hole 2o. When the adjustment plate 2p is closed, the weld nut M stays on the inclined plate 2n in the pipe 2k. Unlike the above-described embodiment, the motor 54 is not fixed to the base 5 in the present variation. The motor 54 is fixed to the pipe 2k by a fixing member 2q. A lower end of the pipe 2k is fixed to the base 5 by a fixing member 2r. The controller 6 is fixed to the base 5. The adjustment plate 2p is not necessarily controlled with the controller 6. Further, the communication hole 2o is not necessarily covered with the adjustment plate 2p.

The attracting members 40 each may be a pair of permanent magnets 41, 41 adjacent to each other and having identical magnetic poles (the S-pole and the S-pole; the N-pole and the N-pole) facing the outer cylinder 20. With this configuration, a uniform magnetic field is formed across a wide area, so that the weld nut M can be attracted to the outer surface 21 of the outer cylinder 20 even in the case of a large weld nut M.

The number of permanent magnets in each of the attracting members 40 is not limited to two. The number may be one, or three or more.

The device body 3 (the part transporting device) does not necessarily include the front/back sorting guide 90. For example, a mechanism for sorting the front/back of the weld nut M may be provided further downstream of the device body 3 (the part transporting device).

In the above-described embodiment, the part to be transported is a square weld nut, but the present disclosure is not limited thereto. For example, a nut having another shape such as a hexagonal weld nut or a round weld nut may be applied. Further, the part to be transported is not necessarily the weld nut, and may be a normal nut having no protrusion m2. Alternatively, the part may be a nut having protrusions on both front and back sides. The part to be transported is not necessarily a nut, and may have any configuration as long as the part is attracted by the attracting members 40.

In the above-described embodiment, the shape of the permanent magnet 41a, 41b is a rectangular parallelepiped shape, but is not limited thereto. The shape of the permanent magnet 41a, 41b may be a columnar shape, for example.

In the above-described embodiment, the outer cylinder 20 is in a cylindrical shape, but is not limited thereto. The outer cylinder 20 may have a polygonal cross-sectional shape such as a rectangular tubular shape.

In the above-described embodiment, the shaft 51 is in a columnar shape, but is not limited thereto. The shaft 51 may be in a cylindrical shape provided with a through-hole at the center. As long as the attracting members 40 can be held in the spiral shape, the shaft 51 may be any shape such as an oval cross-sectional shape or a polygonal cross-sectional shape.

Further, grooves formed in a spiral shape may be provided in the surface of the columnar or cylindrical shaft 51, and the attracting members 40 may be fitted in the respective grooves. With this configuration, the attracting members 40 are held on the shaft 51 only by being fitted in the grooves; therefore assembling can be facilitated.

In the above-described embodiment, the outer cylinder 20, the shaft 51, and the spiral P have the common center axis X, but are not limited thereto. For example, the center axes of the spiral P and the shaft 51 may be eccentric with respect to the center axis of the outer cylinder 20.

The present disclosure is applicable to the part transporting device; thus, the present disclosure is extremely useful and has high industrial applicability.

What is claimed is:
1. A part transporting device comprising:
an outer cylinder;
multiple attracting members that are arrayed in a spiral shape about a center axis extending in an axial direction of the outer cylinder, on an inner surface side of the outer cylinder and that form a magnetic field on an outer surface side of the outer cylinder to attract a part to an outer surface of the outer cylinder,
a rotary drive unit configured to rotatably move the attracting members about the center axis; and a restriction member that restricts rotational movement of the part to move the part axially along the outer surface of the outer cylinder.

2. The part transporting device of claim 1, further comprising:
a front/back sorting member, wherein
the front/back sorting member allows passage of the part having a front surface facing the outer surface, and rejects the part having a back surface facing the outer surface to block passage of the part, based on a difference in a thickness of a protrusion from the outer surface of the outer cylinder.

3. The parts transporting device of claim 2, wherein the outer cylinder extends vertically.

4. The part transporting device of claim 3, further comprising:
a part storage that is provided on the outer surface side of the outer cylinder and below the front/back sorting member and that stores multiple parts therein in a non-aligned state.

5. The part transporting device of claim 2, further comprising:
an orientation changing member provided on the outer surface side of the outer cylinder, wherein
the orientation changing member changes an orientation of the part such that the front or back surface of the part faces the outer surface of the outer cylinder.

6. The part transporting device of claim 1, wherein the rotary drive unit includes
a holder that holds the attracting members with the attracting members arrayed in the spiral shape, and
a drive section configured to rotate the holder about the center axis.

7. The part transporting device of claim 1, wherein the outer cylinder is in a cylindrical shape.

8. The part transporting device of claim 1, wherein each of the attracting members is a pair of permanent magnets adjacent to each other and having different magnetic poles facing the outer cylinder.

9. The part transporting device of claim 1, wherein each of the attracting members is a pair of permanent magnets adjacent to each other and having identical magnetic poles facing the outer cylinder.

* * * * *